United States Patent
Ramasubramani et al.

(10) Patent No.: US 6,233,577 B1
(45) Date of Patent: *May 15, 2001

(54) CENTRALIZED CERTIFICATE MANAGEMENT SYSTEM FOR TWO-WAY INTERACTIVE COMMUNICATION DEVICES IN DATA NETWORKS

(75) Inventors: Seetharaman Ramasubramani, San Jose; Peter F. King, Half Moon Bay, both of CA (US)

(73) Assignee: Phone.com, Inc., Redwood City, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,928

(22) Filed: Feb. 17, 1998

(51) Int. Cl.[7] .................................................. G06F 15/163
(52) U.S. Cl. .......................... 707/9; 707/10; 395/200.33; 395/200.47; 395/200.55; 395/200.59; 380/23; 380/25; 380/30
(58) Field of Search .................... 707/9, 10; 395/200.33, 395/200.47, 200.55, 200.59; 380/25, 30, 23

(56) References Cited

U.S. PATENT DOCUMENTS

| | | | |
|---|---|---|---|
| 5,586,260 | 12/1996 | Hu | 395/200.2 |
| 5,659,616 | * 8/1997 | Sudia | 380/23 |
| 5,671,279 | * 9/1997 | Elgamal | 380/23 |
| 5,675,649 | * 10/1997 | Brennan et al. | 380/21 |
| 5,745,574 | * 4/1998 | Muftic | 380/23 |
| 5,774,552 | * 6/1998 | Grimmer | 380/25 |
| 5,872,848 | * 2/1999 | Romney et al. | 380/25 |
| 5,903,651 | * 5/1999 | Kocher | 380/25 |
| 5,903,882 | * 5/1999 | Asay et al. | 705/44 |

OTHER PUBLICATIONS

Goldman, J., "Internet Security, the next generation. When software encryption is not enough", WEB Techniques, vol.2, No.11, Abstract Only, Nov. 1997.*

(List continued on next page.)

Primary Examiner—Jean R. Homere
(74) Attorney, Agent, or Firm—Stattler Johansen & Adeli LLP

(57) ABSTRACT

The present invention discloses a central certificate management system for thin client devices in data networks and has particular applications to systems having a large number of the thin clients serviced by a proxy server through which the thin clients communicate with a plurality of secure server computers over a data network. According to one aspect, the present invention provides a certificate management module that causes the server device to manage digital certificates for each of the thin client devices. To minimize the latency of obtaining certificates for each of the thin client devices, the certificate management module reserves a fixed number of free certificates signed by a certificate authority and their respective private keys in a certificate database and frequently updates the free certificate according to a certificate updating message. Whenever a user account is created for a thin client device, the certificate management module fetches one or more free certificates from the certificate database and associate the fetched certificates to the created account and meanwhile the certificate management module creates new free certificates with the certificate authority to fill in the certificate database. Apart from the tradition of obtaining certificates locally in client devices that normally have sufficient computing power, the present invention uses the computing resources in a server device to carry out the task of obtaining and maintaining certificates asynchronously in the proxy server and further. These and other features in the present invention dramatically minimize the demands for computing power and memory in thin client devices like mobile devices, cellular phones, landline telephones or Internet appliance controllers.

16 Claims, 8 Drawing Sheets

Microfiche Appendix Included
(2 Microfiche, 184 Pages)

OTHER PUBLICATIONS

King, C., "Building a corporate public key infrastructure", Computer Security journal, vol.13, No.2, abstract only, Fall 1997.*

Sameshima, Y., "Security architecture based on secret key and priviledge attribute certificates", Distributed Platforms, Abstract Only, Mar. 1996.*

"HDTP Specification," *Unwired Planet, Inc.*, Version 1.1, Part No. HDTP–SPEC–DOC–101, Jul. 15, 1997, pp. 1–40.

"HDML 2.0 Language Reference," *Unwired Planet, Inc.*, Version 2.0, Part No. HDMLREF–DOC–200, Revision D, Jul. 1997, pp. 1–56.

Aziz A. et al.: *Privacy and authentication For Wireless Local Area Networks a Secure Communications Protocol to Prevent Unauthorized Access*: IEEE Personal Communications, US, IEEE Communications Society, vol. 1, No. 1, pp. 25–31; 1 Jan. 1994.

Lai, M.K.F. et al.: *A Mobile subscriber Proxy Preserving Writer–to Reader Message Security*: Annual Military Communications Conference, US, New York, IEEE, vol. $15^{th}$ pp. 461–467, 1996.

* cited by examiner-

CENTRALIZED CERTIFICATE MANAGEMENT SYSTEM FOR TWO-WAY INTERACTIVE COMMUNICATION DEVICES IN DATA NETWORKS

REFERENCE TO A "MICROFICHE APPENDIX"

Appendix A, which is a part of the present disclosure, is a microfiche appendix entitled "Centralized Certificate Management System for Two-way Communication Devices in Data Networks" consisting of 2 sheets of microfiche having a total of 184 frames. The microfiche Appendix is a source code listing of one embodiment of the centralized certificate management system for two-way interactive communication devices over a wireless data network in the present invention, which is described more completely below.

A portion of the disclosure of this patent document contains material, that includes, but is not limited to, Appendices A, B and C, which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of Invention

The present invention relates to data security between server computers and client computers in data networks, and more particularly relates to systems for managing, in a proxy server computer, digital certificates for two-way interactive communication devices over the data networks; wherein the two-way interactive communication devices, such as mobile devices, cellular phones, landline telephones and Internet appliance controllers, have generally limited computing resources such as computing power, memory and graphical display capability.

2. Description of the Related Art

A fast-growing trend on the Internet is electronic commerce. The electronic commerce is an integrative concept designed to draw together a wide range of business support services, trading support systems for commodities, products, customized products and custom-built goods and services; ordering and logistic support systems; settlement support systems; and management information and statistical reporting systems, all via the Internet. It is well known, however, that the Internet is a wide open, public and international network of interconnected computers and electronic devices around the world. The ability to send and receive secure data becomes a fundamental requirement in conducting electronic commerce over the Internet. To transact business over the open network, a business or organization must have an efficient and reliable manner to establish its identity and credibility to protect itself and its customers from imposters. Similarly, customers need assurance that their private information they may submit over the Internet can not be read by anyone but the business that they submit to.

One of the on-going efforts to ensure private communications or business transactions between two authenticated parties is to use digital certificates to bind the identities of the two parties to a pair of electronic keys that can be used to encrypt and sign digital information transmitted over the Internet. A digital certificate makes it possible to verify someone's claim that they have the right to use a given key, which helps prevent others from using phony keys to impersonate authorized users. Used in conjunction with encryption, digital certificates provide a more complete security solution by assuring the identity of all parties involved in a transaction through an open network.

The current architecture for using the digital certificates is binding between two computers, one being a client computer and the other being a server computer, on the Internet, that means both computers physically hold their own certificates, requiring a memory space to keep certificates. In case, one of the certificates becomes invalid (expired, revoked or no longer usable), the computer that owns the invalid certificate may acquire a new certificate from a certificate issuing authority. However, the acquiring process generally takes a number of minutes and a significant amount of computing power. When a communication session between the two computers is established, the two computers authenticate each other by examining the counterpart's certificate. A session key is created when the authentication is successful and a secure communication session thus commences using the session key to encrypt all information exchanging between the two computers. The authentication process also takes a significant amount of computing power.

When the client computer is a small two-way communication device such as a mobile computing device, a cellular phone, a landline telephone, or an Internet appliance controller, the above architecture is hardly applicable. To increase the portability and mobility, most of such two-way communication devices are designed small in size, light in weight, low in power consumption and as economically as possible. Such designs, often considered as thin-client designs, result in a very limited computing power, typically equivalent to less than one percent of what is provided in a typical desktop or portable computer and the memory capacity thereof is generally less than 250 kilobytes. That means that the thin client devices would not have extra memory spaces to store a number of certificates and the required computing power to acquire a new certificate in real time if one of the possessed certificates becomes invalid. There is thus a great need for providing the thin clients with a mechanism to effectively manage the certificates.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Notation and Nomenclature

Figure 1:
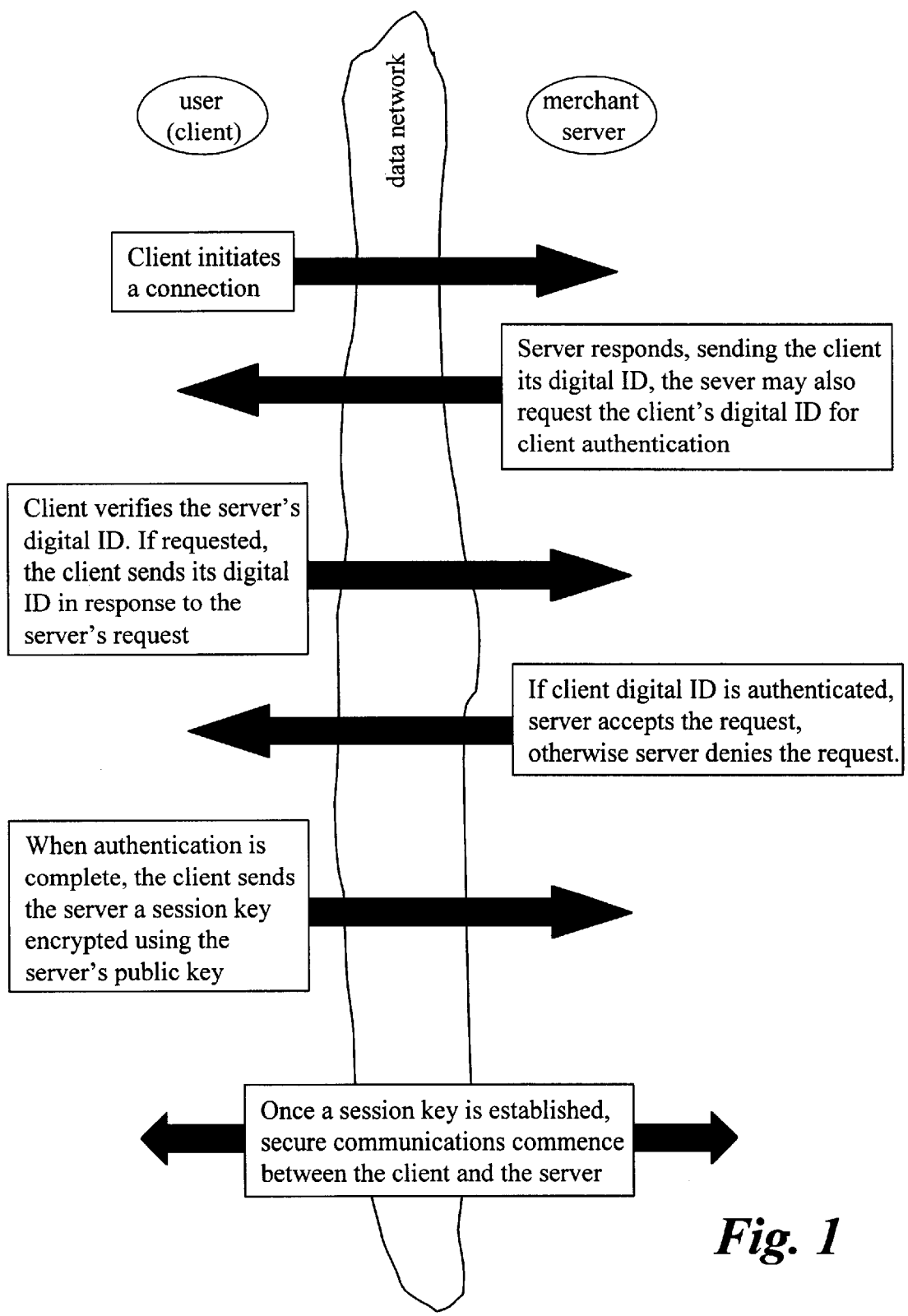
FIG. 1 illustrates, as an exemplary illustration, how the certificates are being used between a client device and a merchant server.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art. The present invention is a centralized certificate management system for two-way interactive communication devices in data networks. The method along with the architecture to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

Introduction to Digital Certificates

A digital certificate or certificate, sometimes referred as digital ID or security certificate, is a piece of information, often stored as a text file, to be used by the secure sockets layer (SSL) protocol to establish a secure connection between two parties over an open data network. In the simplest form, a certificate contains a public key and a name. As commonly used, a certificate also contains an expiration date, the name of the certifying authority that issued the certificate, a serial number, and perhaps other information. Most importantly, it contains the digital signature of the certificate issuer, i.e. an encrypted "fingerprint" that can be used to verify the contents of the certificate.

A digital certificate, or simply certificate, is issued by a Certification Authority (CA) and signed with the CA's private key. The most widely accepted format for digital certificates is defined by the CCITT X.509 international standard; thus certificates can be read or written by any application complying with the CCITT X.509 standard. A digital certificate uses public key encryption techniques that are based on a pair of related keys, a public key and a private key. In public key encryption, the public key is made available to anyone who wants to correspond with the owner of the key pair. The public key can be used to verify a message signed with the private key or encrypt messages that can only be decrypted using the private key. The security of messages encrypted this way relies on the security of the private key, which must be protected against unauthorized use.

The key pair in a certificate is bound to a user's name and other identifying information. When installed in Hyper Text Markup Language (HTML) browser, such as Netscape Navigator from Netscape Communication Inc. in California or Internet Explorer from Microsoft Corporation of Richmond, Wash., the certificate functions as an electronic credential that sites being contacted can examine. This sometimes enables digital certificates to replace password dialogs for information or services that require membership or restrict access to particular users. For example, when one sends messages to a merchant web site, he signs the messages and encloses his digital ID to assure the recipient of the message that the message was actually sent by him. When the merchant receives digitally signed messages, the signer's digital ID is verified to determine that no forgery or false representation has occurred. Generally, once a user obtains a certificate, he can set up his security-enhanced web or e-mail application to use the certificate automatically. FIG. 1 illustrates the authentication process using the digital IDs between the client and the merchant server.

The most secure use of authentication involves enclosing one or more certificates with every signed message. The receiver of the message would verify the certificate using the certifying authority's public key and, now confident of the public key of the sender, verify the message's signature. There may be two or more certificates enclosed with the message, forming a hierarchical chain, wherein one certificate testifies to the authenticity of the previous certificate. At the end of the certificate hierarchy is a top-level certifying authority, which is trusted without a certificate from any other certifying authority. The public key of the top-level certifying authority must be independently known, for example, by being widely published. In other words, a sender whose company is known to the receiver may need to enclose only one certificate (issued by the company), whereas a sender whose company is unknown to the receiver may need to enclose two or more certificates. For higher grade of security, it is a common practice to enclose just enough of a certificate chain so that the issuer of the highest level certificate in the chain is well known to the receiver. If there are multiple recipients, then enough certificates should be included to cover what each recipient might need.

The Preferred Embodiment

Figure 2:
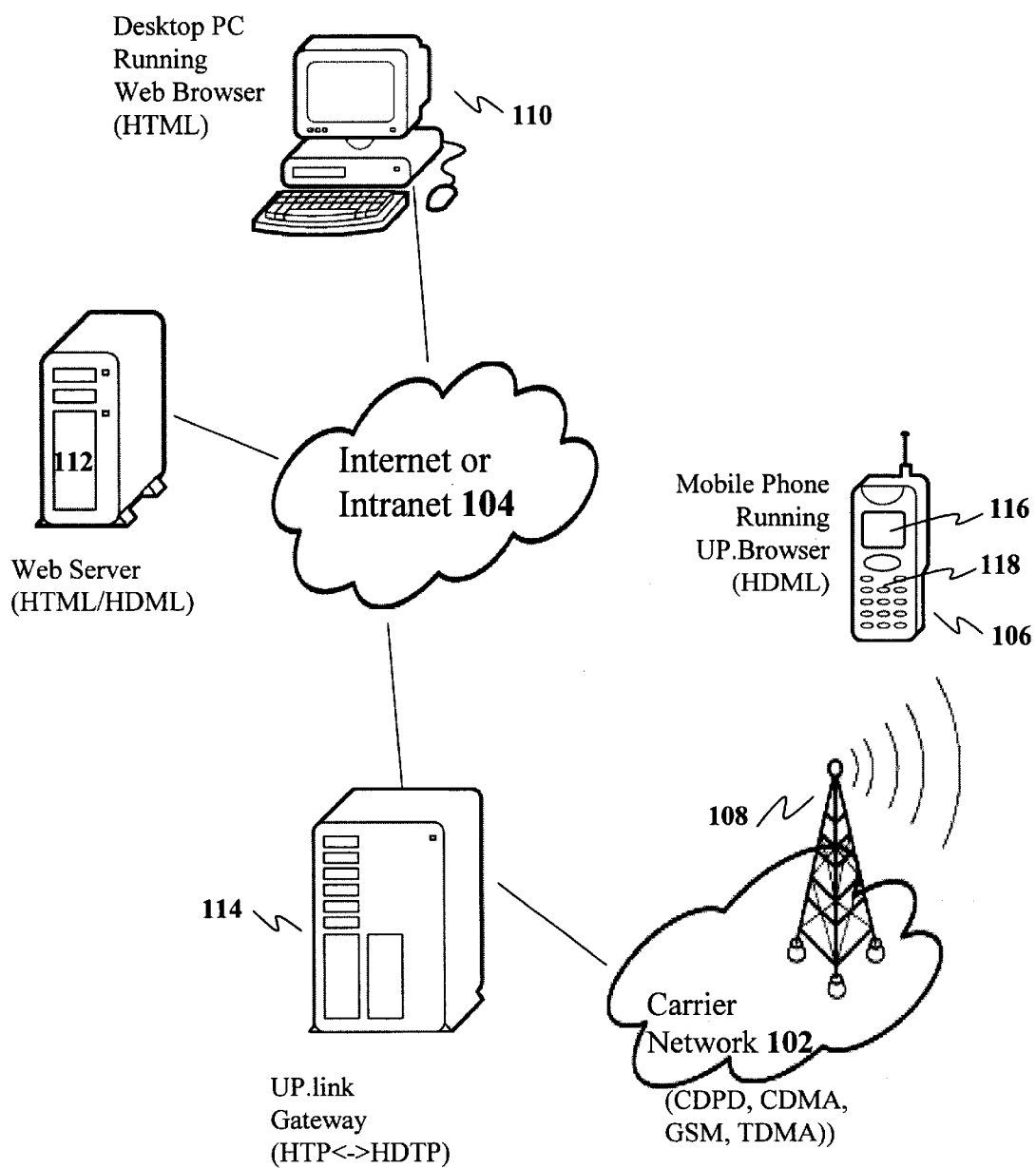
FIG. 2 illustrates a schematic representation of a mobile data network comprising an airnet and a landnet, in which the present invention may be practiced.

Referring now to the drawings, in which like numerals refer to like parts throughout the several views. FIG. 2 illustrates a schematic representation of a data network 100 in which the present invention may be practiced. The data network 100 comprises an airnet 102 that is generally called wireless network and a landnet 104 that is generally a landline network, each acting as a communication medium for data transmission therethrough. The airnet 102, in which the data transmission is via the air, is sometimes referred to as a carrier network because each airnet is controlled and operated by a carrier, for example AT&T and GTE, each having its own communication scheme, such as CDPD, CDMA, GSM and TDMA for the airnet 102. The landnet 104 or the Internet, used interchangeably herein, may be the Internet, the Intranet or other private networks. Referenced by 106 is one of the mobile devices that can be a mobile device, a cellular phone, a landline telephone or an Internet appliance controller, capable of communicating with the airnet 102 via an antenna 108. It is generally understood that the airnet 102 communicates simultaneously with a plurality of two-way communication devices, of which only a mobile device 106 is shown in the figure. Similarly, connected to the Internet 104 are a plurality of desktop personal computers (PCs) 110 and a plurality of server computers 112, though only one representative respectively is shown in the figure. The PC 110, as shown in the figure, may be a personal computer SPL 300 from NEC Technologies Inc. and runs a HTML Web browser via the Internet 104 using HyperText Transport Protocol (HTTP) to access information stored in the web server 112 that may be a workstation from SUN Microsystems Inc. It is understood to those skilled in the art that the PC 110 can store accessible information therein so as to become a web server as well. Between the Internet 104 and the airnet 102 there is a proxy server computer 114 performing data communication therebetween. The proxy server computer 114, also referred to as link server or gateway server computer, may be a workstation or a personal computer and performs mapping or translation functions, for example, mapping from one protocol to another, thereby the mobile device 106 can be in communication with any one of the servers 112 or the PCs 110, respectively.

One communication protocol used on the Internet 104 is the well known HyperText Transfer Protocol (HTTP) or HTTPS, a secure version of HTTP. HTTP runs on the Transport Control Protocol (TCP) and controls the connection of a well known HyperText Markup Language Web browser, or HTML Web browser in the server 114, to the Web server 112, and the exchange of information therebetween. HTTPS supports SSL that is used mostly in secure and authenticated communications between the HTML browsers and web servers. A common notation in the HTML browsers is the use of "https" before a universal resource locator, or URL, which indicates that an SSL connection will be established. In an SSL connection one side, preferably the server side, of the connection shall have a certificate that must be authenticated by the counterpart side. Each side then encrypts what it sends out using information from either its own, the other side or both side certificate, ensuring that only the intended recipient can decrypt it, and that the other side can be sure the data come from the place it claims to have come from, and that the message has not been tampered with.

The communication protocol between the mobile device 106 and the proxy server 114 via the airnet 102 is Handheld Device Transport Protocol (HDTP), or Secure Uplink Gateway Protocol (SUGP), which preferably runs on User Datagram Protocol (UDP) and controls the connection of a HDML Web browser, in the mobile device 106, to the proxy server 114, where HDML stands for Handheld Device Markup Language. HDML, similar to that of HTML, is a tag based document language and comprises a set of commands or statements specified in a card that specifies how information displayed on a small screen of the mobile device 106. Normally a number of cards are grouped into a deck that is the smallest unit of HDML information that can be exchanged between the mobile device 106 and the proxy server 114. The specifications of HDTP, entitled "HDTP Specification" and HDML, entitled "HDML 2.0 Language Reference" are enclosed and incorporated herein by reference in its entirety. The HDTP is a session-level protocol that resembles HTTP but without incurring the overhead thereof and is highly optimized for use in thin devices that have significantly less computing power and memory. Further it is understood to those skilled in the art that the UDP does not require a connection to be established between a client and a server before information can be exchanged, which eliminates the need of exchanging a large number of packets during a session creation between a client and a server. Exchanging a very small number of packets during a transaction is one of the desired features for a mobile device with very limited computing power and memory to effectively interact with a landline device.

The mobile device 106 comprises a display screen 116 and a keyboard pad 118. The hardware components including a microcontroller, a ROM and a RAM in the mobile phone 106 are known to those skilled in the art and so the hardware components are not described in detail herein. With the display screen 116 and the keypad 118, a user of the mobile device 106 can interactively communicate with the proxy server 114 over the airnet 102. According to one embodiment, one portion of the compiled and linked processes of the present invention are stored in the ROM as a client module that causes the mobile device 106 to operate with the proxy server 114. Upon activation of a predetermined key sequence utilizing the keypad 118, the microcontroller initiates a communication session request to the proxy server 114 using the client module in the ROM. Upon establishing the communication session, the mobile device 106 typically receives a single HDML deck from the proxy server 114 and stores the deck as cached in the RAM. As described above, an HDML deck comprises one or more cards and each card includes the information required to generate a screen display on the display screen 116. The number of cards in a card deck is selected to facilitate efficient use of the resources in the mobile device 106 and in the airnet network 102. Generally, one of the cards is a choice card shows a sequence of frequently visited web sites and allows the user to choose one to make a secure and authenticated communication session with through the proxy server 114. The process of using certificates to establish such communication session will be described below.

Figure 3:
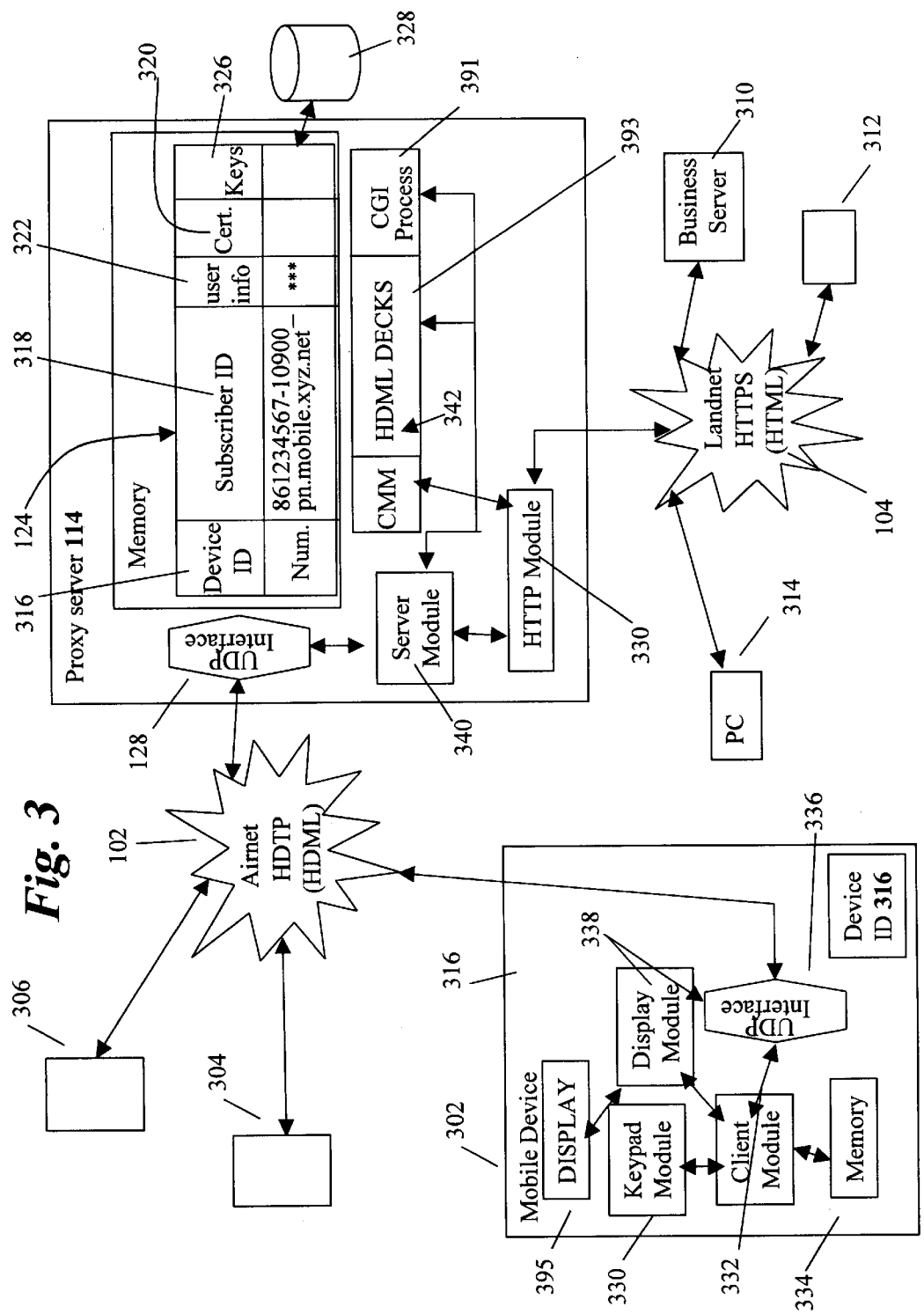
FIG. 3 illustrates a representation of the present invention interacting with other parts or components in the data network.

Referring now to FIG. 3, there is depicted a representation of the present invention interacting with other parts or components in the data network. Referenced by 302, 304 and 306 are three representatives of a plurality of the mobile devices coupled to the airnet 102, similarly referenced by 310, 312 and 314 are three representatives of a plurality of landline devices coupled to the landnet 104. The proxy server device 128, which can be the one 114 in FIG. 2, couples the airnet 102 to the landnet 104, therefore any mobile devices can communicate with the landline devices via the airnet 102, the proxy server 114 and the landnet 104. To facilitate the description of the present invention, the internal block diagrams of the mobile device 302 and the link server 114 are respectively illustrated. Other processes and hardware are known to those skilled in the art and are not illustrated in detail in the figure for clarity.

Each of the mobile devices, such as the one 302, is assigned to a device ID 316. The device ID 316 can be a phone number of the device or a combination of an IP address and a port number, for example: 204.163.165.132:01905 where 204.163.165.132 is the IP address and 01905 is the port number. The device ID 316 is further associated with a subscriber ID 318 authorized by a carrier in the proxy server 114 as part of the procedures to activate the mobile device 302 by establishing a user account 324 in the proxy server 114. The subscriber ID 318 may take the form of, for example, 861234567-10900_pn.mobile.att.net by AT&T Wireless Service. The subscriber ID 318 is a unique identification of the mobile device 302. In other words, each of the mobile devices 302, 304 and 306 has its own unique device ID that corresponds to a subscriber ID indexing a respective user account in the proxy server 114. The following description is based on the mobile device 302 and the associated account 324, it will be appreciated by those skilled in the art that the description is equally applied to a plurality of the mobile devices in communication simultaneously with the proxy server 114.

The account 324, indexed by the device ID 316 or the subscriber ID 318 and identified by an address identifier such as a URL, is a data structure comprising user info 322, a certificate list 320 and a private key list 326, wherein the user info 22 includes the account configuration and other account related information, such as username and password. The URL of the account may take the form of, for example, www.att.com/Pocketnet, which indicates that the airnet 102 is operated by AT&T wireless service. The certificate list 320 contains or points to a list of designated certificates issued by one or more CAs and the private key list 326 contains a list of keys, each corresponding respectively to each certificate in the certificate list 320. All certificates in the certificate list 320 are exclusively associated with the particular account. Generally the proxy server 114 maintains a large number of such user accounts, preferably kept in a database 328, each of the user accounts is respectively associated to each of the mobile devices that are subscribed with the same carrier and serviced by the proxy server 114. It can be appreciated that the certificates in one account are different from those in other accounts because of the respective association of the certificates with each of the accounts therein.

It has been described that it takes a noticeable length of time in a regular full-power desktop computer to obtain a certificate from a CA and generate a pair of keys; private and public keys therefor. To minimize the latency of obtaining a certificate with a mobile device, a certificate manager module (CMM) 342 maintains a certificate database, preferably in the database 328, to reserve a list of undesignated but issued certificates, referred to as free certificates, from one or different CAs. Whenever a user account is created to activate a mobile device that requires one or more certificates to access certain web servers requiring a certificate, a certificate request (certRequest) signal is sent to the CMM 342 to fetch needed certificates from the certificate database. Upon receiving the fetched certificates from the certificate database, the CMM 342 assigns the certificates to the particular account by attaching the device ID 316 and other account information, hence the fetched certificates become associated to the particular account and are placed in the certificate list 320. Meanwhile the CMM examines the number of the free certificates available in the certificate database, if the number is below a value, for example 200 certificates, referred to as threshold, the CMM calls the HTTP module 330 to establish a connection to the appropriate CA via the landnet 104 to obtain new free certificates to fill up the certificate database till the level of the threshold is reached, as such there are always sufficient free certificates available in the certificate database to supply any new accounts with the ready-to-use free certificates.

It can be now appreciated by those skilled in the art that the present invention uses the computing power in a proxy server to carry out the task of obtaining certificates asynchronously, apart from the tradition of obtaining certificates in local devices that normally have sufficient computing power, and further, unlike the tradition of physically storing the certificates in the local devices, the present invention maintains the certificates in a user account in the proxy server. Managing certificates in a proxy server for all clients makes it possible for the clients to access any secure web sites without demanding additional computing power and memory. Other advantages will be further appreciated in the description below.

The certificates are issued by a CA that can be any trusted central administration willing to vouch for the identities of those to whom it issues certificates and their association with a given key, for example, a company or a university may issue certificates to its own employees or its students. To accommodate the need of the mobile device 302 to obtain certificates from a CA other than the one that the CMM 342 uses to get the free certificates from, the server module 340 allows the user thereof to log onto the user account 324 associated to the mobile device 302 through any computers, for example, a PC 314 coupled in the landnet 104. This is accomplished by logging onto the user account 324 using the address identifier of the user account 324, for example: www.att.com/Pocketnet. To ensure that the account 324 is accessed by an authorized user, a set of credential information, such as a username and password, is required. The server module 340 through the HTTP module 330 will prompt for the username and password when the user connects the PC 314 to the URL using http://www.att.com/Pocketnet. Entries of a pair of matched username and password will be granted the permission to access the account.

To provide flexibility and security to the account, the username and password are fully administrated by the user. The user of the mobile device 302 can access the device's account 324 in the proxy server 114 using the mobile device 302 that is equipped with a HDML browser. Knowing the URL of the account, the user depresses a predetermined key to cause the client module 332 to send a request comprising the URL and the device ID 316 to UDP interface 336 that subsequently establishes a communication session to the proxy server 114 using the HDTP. The request is received by the corresponding UDP interface 128 in the proxy server 114 and carried out by the server module 340 to see if the device ID is authorized. The proxy server 114 then acknowledges the request with a response sent to the mobile device 302 for username and password. It should be noted that the response does not request from the user a pair of username and password to permit an access to the account, in fact the permission to access to the account has been granted by matching the device ID 316 in the request from the mobile device 302 and the stored device ID of the account 320 in the proxy server 114. Instead, the response allows the user to self-provision the account by entering a pair of new username and password. Once the account 320 receives the pair of new username and password, the account, i.e. the user info 322, is updated. After the self-provisioning procedure, the user may use the PC 314 which has preferably a sufficient computing power and equipped with a more familiar HTML browser to establish a communication session using HTTP and the URL to the account. The newly provisioned username and password are entered in the PC 314 when prompted and sent over in a packet format to the proxy server 114 using HTTP in which the HTTP server 330 extracts the username and password and the server module 340 performs an authorization check with the user info 322 in the memory. If the entered username and password are matched, the authorization is granted so that the user or the PC 314 is permitted to access the account 324. The user can now request a certificate from a specified CA and updates the certificate list 320 and the key list 326. The process of obtaining a certificate from a CA using an HTML browser is known to those skilled in the art and therefore is not to be described herein. It can be appreciated that, besides the capabilities provided by the CMM, the self-provisioning capability allows a user to tailor the certificates to his own needs while still relying on the proxy server to keep all the certificates designated to the mobile device 302.

Figure 4A:
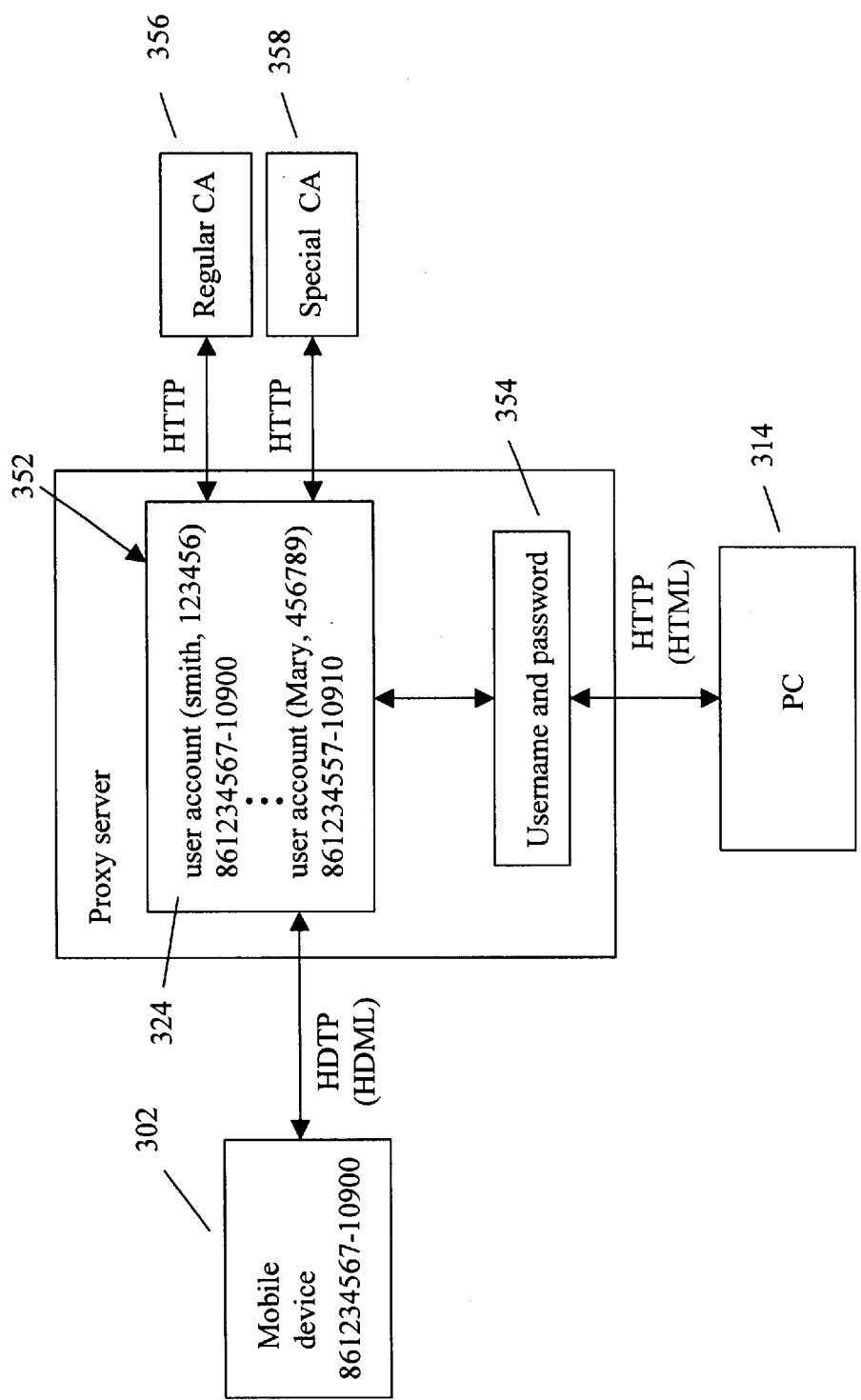
FIGS. 4A and 4B demonstrate an example in which a user of a mobile device requests certificates from a user-specified CA.
Figure 4B:
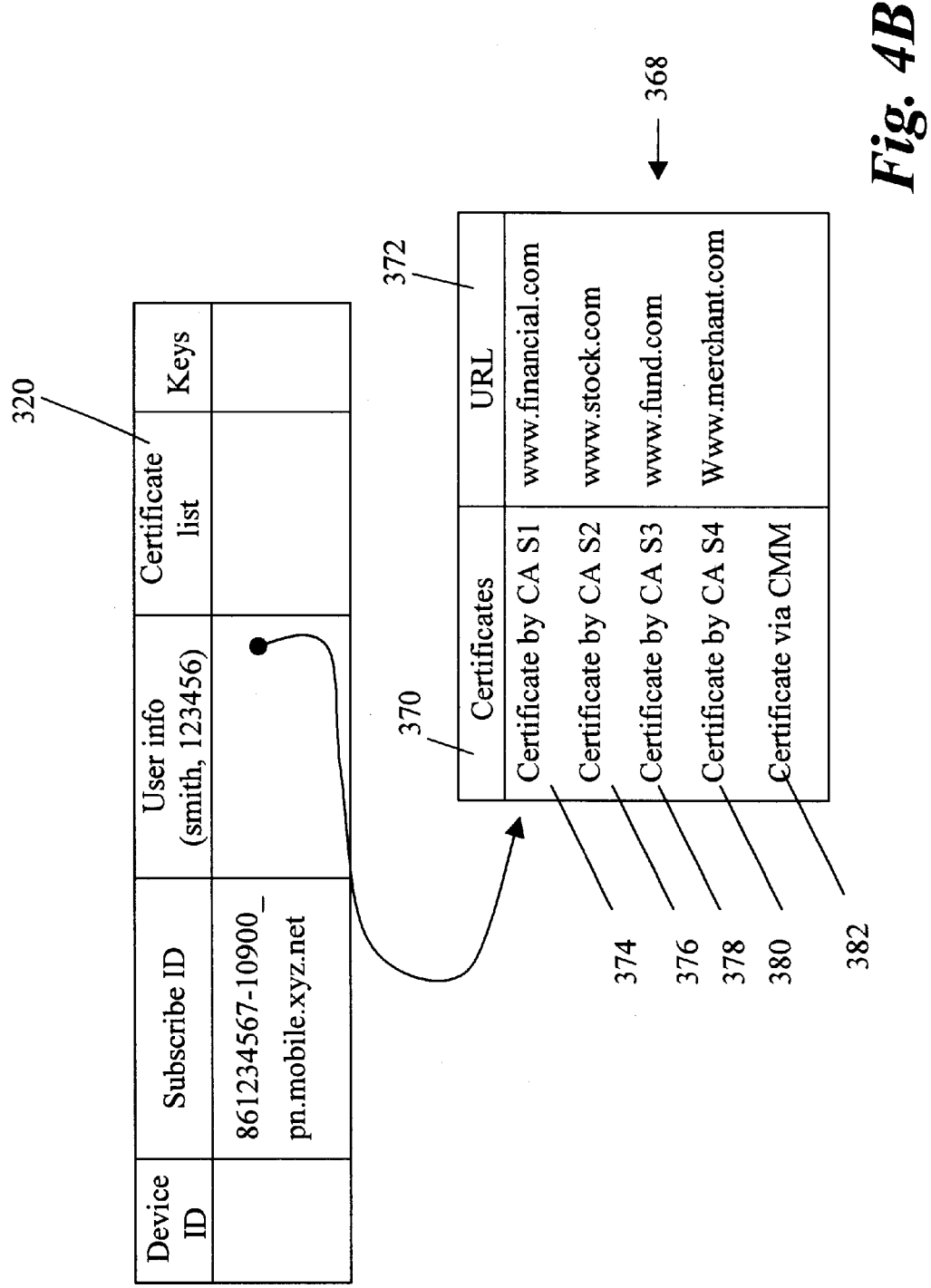

Based on FIG. 3, FIGS. 4A and 4B demonstrate an example in which the user of the mobile device 302 requests certificates from user-specified CAs. After a predetermined key is pressed, the mobile device 302 uses HDTP to make a request to connect to the proxy server 114 using the URL of the account designed to the mobile device: 30286123456-10900_pn.mobile.xyz.net. The device ID 86123456-10900 is extracted from the request and verified that there is an account 324 indexed by the same device ID 86123456-10900. Upon the verification, the user of the mobile device 302 is prompted for a set of username and password. It has been described that username and password are not the required information for the mobile device 302 to access the account 324, rather the user is given a permission to administrate the username and password. If the user does not enter any new username and password, the username and password in the user account 324 stays the same. If the user enters a set of new username and password, for example; username="smith", and the password="123456", the account 324 is updated with the new username and password. The user can now go to any computer in the landnet 104 to manipulate the account 324. The PC 314 is equipped with a HTML browser providing a full graphical user interface that allows the user to manipulate the account 324 much more efficiently. The PC 314 establishes an HTTP connection using the URL, for example, mobile.xyz.net, of the gateway 354 in the server module 340 to all the user accounts in the proxy server 114. The user is prompted at the PC 314 for a set of username and password. The user must enter "smith" for the username and "123456" for the password to get through the gateway 354. Upon receiving the entered username and password, the gateway 354 compares them with the ones in the account 324. If there is a mismatch, the PC or the user is not permitted to access the account 324. If the entered username and password match the ones in the account 324, the gateway 354 grants permission to the PC 314. The user of the PC 314 can now use the HTML browser to request special certificate from a special CA 358 by providing a URL thereof and place the certificate the account 324 for the mobile device 302 to use.

According to one embodiment of the present invention, the certificate list may be implemented as a pointer to a certificate table 368. As is shown in FIG. 4B, it can be appreciated to those skilled in the art that the use of pointer provides flexible capacity of the certificate list. The certificate index 370 provides a space to store all the certificates and the corresponding URL list 372 associated URL for the specially requested certificates in the certificate index 370. There are a few service web sites that accept certificates from certain CAs. For example, a financial web site identified by www.financial.com only takes certificates signed by CA S1. By self-provisioning the account, the user can specifically request the certificate from CA S1 and place the certificate in the certificate table 368. In a later use, the mobile device 302 sends a request to establish a connection to www.financial.com. When the request comprising www-.financial.com is received in the proxy server device 114, the URL is used to retrieve the corresponding certificate, the certificate by CA S1 in this case. Along with the certificate by CA S1, the mobile device 302 can access the web identified by www.financial.com. Generally, the certificate 382 acquired by the CMM 342 is a generic one acceptable to many web sites and not associated with a particular URL. In other words, the certificate table 368 may have a number of special certificates, such as referenced by 376, 378 and 380, specifically requested by the user and one or more generic certificates, such as referenced by 382, automatically acquired by the CMM 342.

Figure 5:
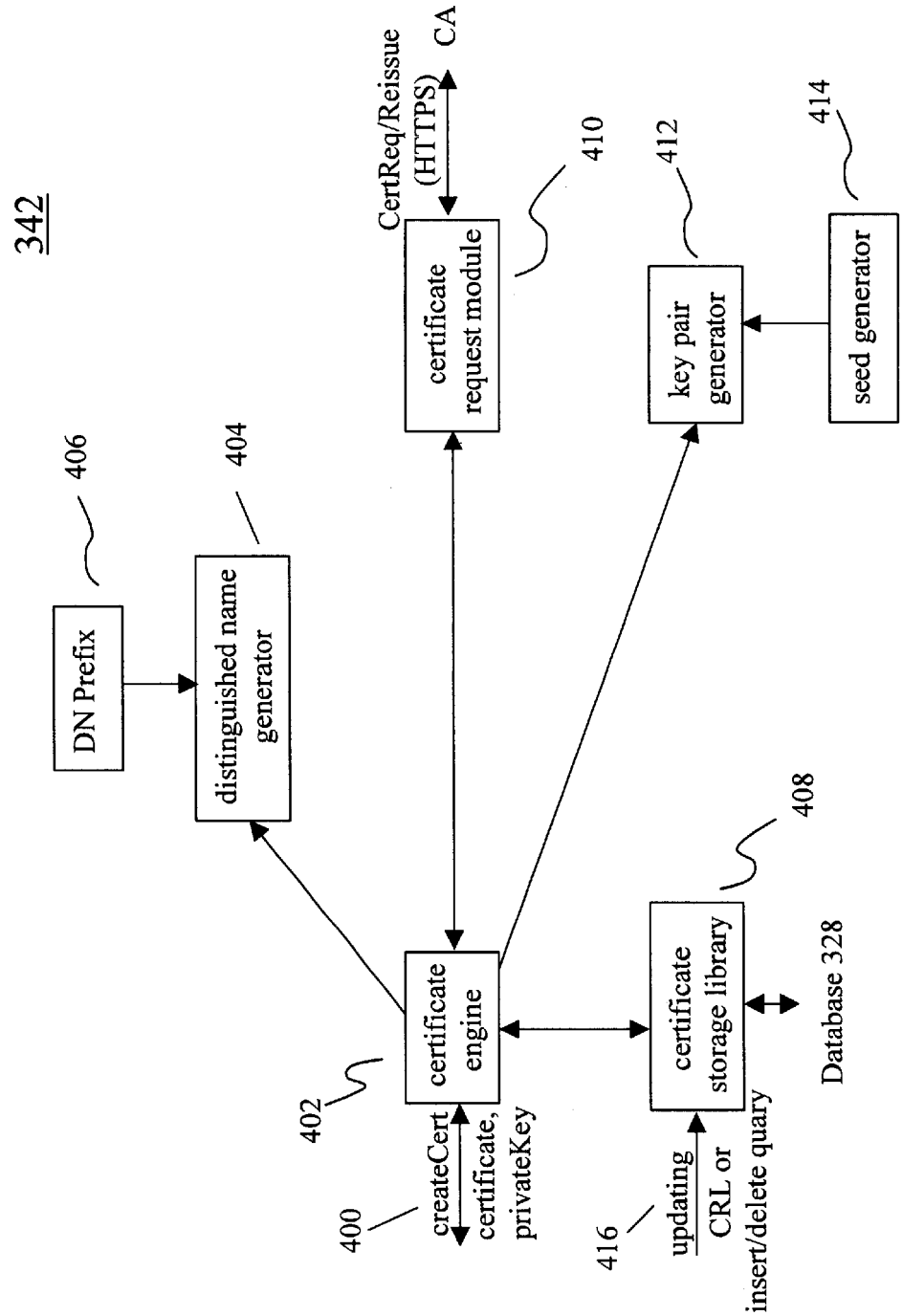
FIG. 5 depicts a block diagram of various components in a certificate management module in the present invention.

FIG. 5 illustrates a block diagram of various components in the CMM 342. As described above, the CMM maintains a fixed number of free certificates in the certificate database and starts to get new certificates through the HTTP server 330 from the CA as soon as the number of the free certificates in the certificate database becomes lower than the threshold. Referenced by 402 is a certificate engine that manages the operations of other components in CMM 342. When the mobile device 302 is activated, the account thereof is requested to load with one or more certificates. After a free certificate is fetched from the certificate database and upon detecting that the number of available free certificates in the certificate database below the threshold, the engine 402 triggers the distinguished name generator 404, or DN generator, to generate a unique distinguished name for a new certificate to be created.

The distinguished name is the standard form of naming in the CCITT X.509 standard. A distinguished name comprises one or more relative distinguished names, and each relative distinguished name is comprised of one or more attribute-value assertions. Each attribute-value assertion consists of an attribute identifier and its corresponding value information, e.g. CountryName=US, Organization=XYZ, Inc. or OrganizationUnit=XYZ Service Division. The use of the distinguished names is intended to identify entities in a X.500 directory tree that is now being used to implement "white pages" for the Internet—a directory of people, computers, services, and electronic mail addresses. The directory is organized hierarchically: international organizations and countries are at the top; countries are subdivided into states or provinces, which in turn are subdivided in various ways. A relative distinguished name is the path from one node to a subordinate node of the directory tree. The entire distinguished name traverses a path from the root of the tree to an end node that represents a particular entity. A goal of the directory is to provide an infrastructure to uniquely name every communication entity in the Internet, hence the "distinguished" in the distinguished name.

To ensure that the distinguished name generated by the distinguished name generator 404 is associated eventually with a user account, the distinguished name prefix generator 406 generates a prefix for the distinguished name. The prefix is generally a concatenation of a timestamp and a subscriber ID, for example, 861765228-9, wherein the timestamp indicates when the certificate request is made and the subscriber ID is to be assigned to a mobile device when it is activated. With the prefix from the distinguished name prefix generator 406, the distinguished name generated from the distinguished name generator 404 must be unique. In order words, each of the free certificates in the certificate database has its own name and all the names must be distinguished.

The Certificate Engine 402 then invokes the key pair generator 412, or KP generator, to generate a pair of public and private keys. It does so by using a set of library functions which generates the private key based on the public key that is generated with supplied seed information. To conform to the industry standard, the set of library used in the key pair generator 412 is supplied by RSA Data Security, Inc. having an address of 100 Marine Parkway, Suite 500, Redwood City, Calif. 94065. The generated keys are generally in the form of a sequence of binary numbers, such as 1110101100001 . . . 00101 and unlikely to be duplicated without knowing the source to generate them. To generate a pair of unique private and public keys, a random number, as the source, must be provided according to the set of library. It is understood to those skilled in the art that there are many ways to get the random number. One of the commonly used methods is to generate the random number through a one-way hash function from a noise source that may be hard-coded or from network traffic information. The one-way means that it is significantly easier to perform in one direction (the forward direction) than in the opposite direction (the inverse direction), which makes it unlikely to derive the private key from the public key. One example of such hash functions is to multiply a value itself a certain number of times and followed by a modulo operation.

The certificate engine 402 creates a new entry for the certificate in the certificate database and the corresponding private key from the key pair is stored in the new entry, meanwhile the certificate engine 402 uses the generated distinguished name and the public key obtained from the key pair generator 412 to generate a certificate signing request or CSR. The CSR is a public standard format for requesting certificates from a CA. The CSR contains, among other things, the public key that is to be certified by the CA and the distinguished name associated with the public key. The CSR is a binary block of data packaged in a certificate request in a standard form that is then sent to the CA through the HTTP module 330 using HTTP.

Upon receiving the certificate request, the CA verifies the supplied information therein and attests to the validity of the user's public key along with other information by signing the certificate. The CA then issues a certificate response, which may contain the signed certificate or an error. If the certificate response contains an error, that means the certificate being requested fails, a new process must be restarted. When the certificate response comes back from the CA, the certificate engine 402 extracts the distinguished name from the received certificate and updates the corresponding entry in the certificate database through the certificate storage library 408. At this point that entry contains the signed certificate which has the public key embedded in it and the corresponding private key, which has been referred to as the free certificate.

When the mobile device 302 is activated, a request is submitted for creating a certificate for the device. The certificate engine 402 fetches a free certificate from the certificate database and associates it with the device ID. The association is performed by making an entry in a separate temporary table called device_cert_map_tbl, preferably in a RAM of the proxy server 114.

The certificate storage (CS) library 408, or CS library, is used to administrate the certificate database and from time to time receives certificate revocations lists from CAs. A certificate revocation list (CRL) is a list of certificates that have been revoked before their scheduled expiration date. There are several reasons why a certificate might need to be revoked and placed on a CRL. For instance, the key specified in the certificate might have been compromised, or, the user specified in the certificate may no longer have authority to use the key. To be more specific, a user name associated with a key is "Mr. Smith, Vice President, XYZ Corp." If Mr. Smith left the company, the company may not want him to be able to sign messages with that key, and therefore, the company would place the certificate on a CRL. When verifying a signature, one can check the relevant CRL to make sure the signer's certificate has not been revoked. Whether it is worth the time to perform this check depends on the importance of the signed document. The CRL is maintained by the CA and provides information about revoked certificates that were issued by the CA. The CRL, however, only lists current valid certificates, since expired certificates should not be accepted in any case; when a revoked certificate is past its original expiration date, it is removed from the CRL. Although a CRL is maintained in a distributed manner, there may be central repositories for a CRL, that is, network sites containing the latest CRLs from many organizations.

The certificate library 408 receives such CRL and informs the certificate engine 402 to take action when any certificates maintained by the CMM 342 is in the list. It is described that the CMM 342 maintains a certificate database housing a fixed number of free certificates. When the CMM 342 associates a certificate from the certificate database to a user account, the associated certificate must be valid. This is guaranteed by first consulting with the CRL through the CS library 408. If a fetched certificate from the certificate database is somehow on the CRL, the fetched certificate is discarded and a next certificate is fetched from the certificate database. A check-up of the fetched certificate with the CRL is always performed in the CS library 408 before the fetched certificate is associated to the account. It is understood to those skilled in the art that the check-up with the CRL may be performed by an exhaustive comparison. The time or computation it takes to do the check-up regardless of the length of the CRL is affordable as all are being carried out in the proxy server 114 asynchronously with the mobile device 416.

According to one embodiment of the present invention, the source code listing in the appendix demonstrates operations in the CMM. The main( ) function creates a TCertEngine object and calls initialized by a function named Initialize which creates the necessary threads to service HTTP client based requests. It also creates threads that monitor certificates in the certificate database. When the thread is created it monitors available resources and calls GenerateCert in TCertHttpProto to create certificates. This thread uses TDBCertPool to create a new entry in database for the certificate pool.

The function GenerateCert gets a new Distinguished Name from the Distinguished Name Generator. It also gets a new public/private key pair from the Key Pair Generator. GenerateCert used this information to construct a CSR. It then issues a request to a CA over HTTP using SendCSR method in THttpCertRequest. When the certificate response comes back from the CA, it updates the entry in the free pool using TDBCertPool.

When a free certificate needs to be associated with a user account, the HandleCreateCert method in TCertCreateCallback is invoked. This method extracts a new certificate from the free certificate pool using functions in TDBCertPool. The method then calls functions in TDBDeviceMap to make a new entry in the device_cert_map_tbl. It then returns a response to the caller. The Reissuer thread, TCertReissueThread, calls ReissueCert in TCertHttpProto to have certificates reissued. It calls methods on TDBCertPool to TDBDeviceMap to revoke certificates in the free pool and those that are associated with the device.

Figure 6A:
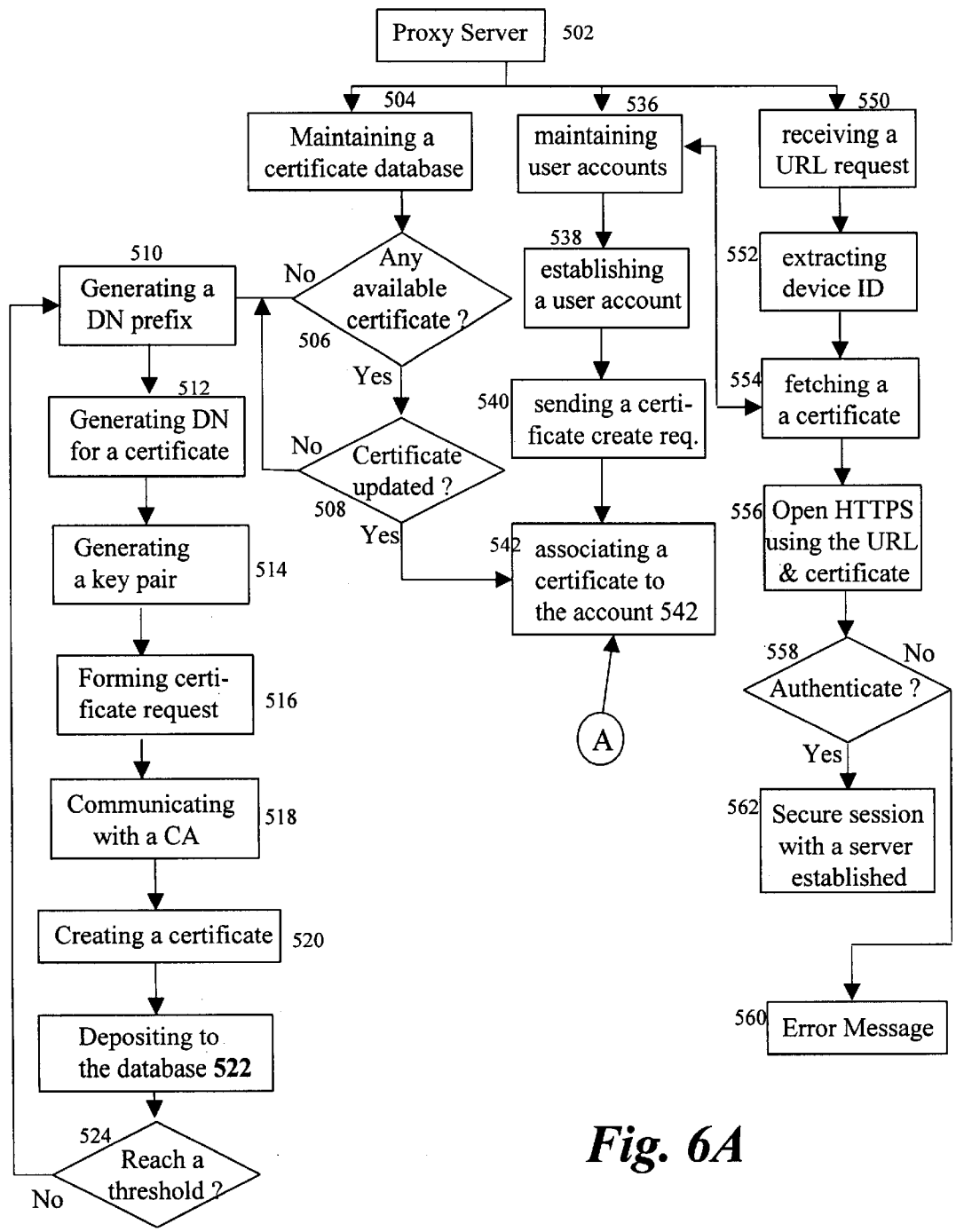
FIGS. 6A and 6B illustrate an operation flowchart showing processes and procedures for managing certificates in a server device for thin clients over a data network.
Figure 6B:
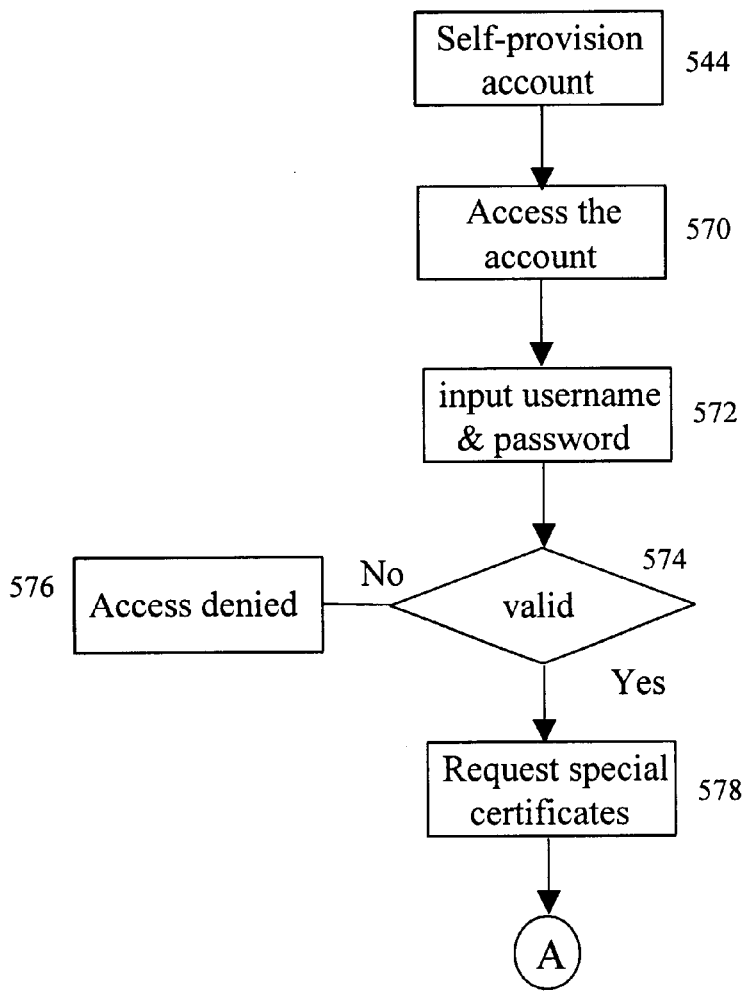

FIGS. 6A and 6B illustrates an operational flowchart of the centralized certificate management system in the present invention and should be understood in conjunction with FIGS. 3 and 4. Complied and linked processes of the present invention are loaded into a proxy server 502 and cause the proxy server 502 to perform the centralized certificate management. It is understood to those skilled in the art that a proxy server is a server computer or device, generally equipped with sufficient computing power and memory, that is loaded with applications that cause the device to service other computing devices, hence the applications therein are commonly referred to as the server and the device itself is referred to herein as server device. The computing devices in the present invention are the thin devices that may be mobile devices, cellular phones and the Internet appliance controllers.

At 504, the CMM 324 cause the server device 502 to maintain a certificate database that is preferably stored in a local storage driver in the server device 502. The certificate database reserves a fixed number of free certificates signed by a CA yet to be associated to a user account or a thin client. By maintaining the ready-to-use free certificates in the database, the thin client can get a certificate associated thereto without a noticeable time delay, needed computing power and memory. At 506, the number of the available free certificates is examined. If the number drops, a process to get new certificate starts at 510. It should be understood that the number of the free certificates in the certificate database is dropped sometime because of the certificate updating at 508. To ensure that the certificates to be associated with user accounts are always valid, the CS library 408 constantly updates the free certificates in the certificate database according to a certificate updating message received from a CA or commonly used repository site. The certificate message may comprise a CRL or insert/delete query, which causes the CMM 324 to discard some of the free certificates, hence the number of the free certificates decreases. In any case, the CMM 324 tries to maintain the level of the free certificates in the certificate database by getting new certificates from a CA. When the process to get a new certificate starts, the CMM 324 first gets a distinguished name for the new certificate by calling the DN prefix generator 406 and DN generator 404 at 510 and 512 and then calls KP generator 412 to generate a pair of private key and public key therefor at 514. A certificate request is formed at 516 to include a CSR comprising the generated distinguished name and the public key. At 518, the CMM 342 communicates with the CA using HTTP through the HTTP server 330. Upon receiving the certificate request, the CA attests to the validity of the public key along with other information by signing the certificate and returns a certificate response to the CMM 342, thus a signed certificate is created at 520. The signed certificate is deposited as a free certificate to the certificate database at 522. Logically the number of the free certificates is incremented by one and compared with the fixed number or threshold. If the incremented number is still below the threshold, the process to get a new certificate is repeated from 510 till the number of the free certificate in the certificate database reaches the threshold.

Meanwhile the CMM 342 maintains a plurality of user accounts at 536, each preferably assigned to one thin client. Each of the accounts has one or more certificates exclusively associated with the account. When a thin client is activated to be serviced by the server device 502, a new user account is established therefor at 538. As described before, the user account may comprise a device ID, a subscriber ID, user info, a certificate list and a private key list. The device ID is a piece of information that helps the server device 502 to recognize which thin client device it is supposed to service and entered when the thin device is activated. The user info contains inform regarding the account configuration and the services that the thin client needs. The subscriber ID, the certificate list and the private key list are obtained when a certificate is associated thereto. At 540, a request to get a certificate is made. Upon receiving the request at 542, the CMM 342 fetches a valid free certificate from the certificate database and associates the free certificate to the account.

The present invention includes a method of self provisioning. Specifically, a user may attempt to self-provision as illustrated at step 544 in FIG. 6B. First, the attempts to access a user account by logging onto the account. If the user is logging in using the thin client device that has a device ID, the access is quickly authenticate. If the user is logging in using a PC connected to the Internet, then the user must enter the current username and password. After obtaining access, the user may change the username and/or password at step 572. The user can then access the account from the thin client or another computing device to request a certificate from a user-specified CA at 578.

After the thin client is activated by establishing the account having one or more certificates in the server device 502, it is now possible for the thin client to establish secure and authenticated communication session with some secure web sites to conduct private communication therebetween. At 550, the server device 502 receives a session request from the thin client to establish a secure and authenticated communication session with a web site identified by a URL. The session request comprises the device ID of the thin client in order for the server device 502 to recognize the thin device and consequently authorize such request therefrom. At 552, the device ID is extracted from the session request and compared with the device ID in the user account. If the devices IDs are matched, the thin device is authorized and further examined per the corresponding account thereof. At 544, the certificate in the matched account is fetched to be included in the session request that is sent to the desired web site using HTTPS. At 558, an authentication between the thin client and the contacted web site is carried out by examining each other's certificate. If each certificate is trusted, a session key is resulted therefrom and used to encrypt information to be exchanged between the thin client and the web site, hence a secure and authenticated communication is established.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

What is claimed is:

1. A method for managing centralized certificates in a proxy server device for a plurality of thin client devices coupled to said proxy server through a data network, the method comprising:

maintaining a free certificate database accessible by said proxy server, the free certificate database comprising a plurality of free certificates issued by a Certificate Authority (CA) wherein each of the free certificates has a corresponding public key and a corresponding private key;

maintaining a user account database wherein said user account database is not a thin client device, said user account database accessible by said proxy server that performs communication on behalf of said thin client devices, said user account database comprising a plurality of user accounts, each of the thin client devices associated with one of said user accounts wherein each of the user accounts comprises a device ID, a list of public and private keys assigned to the user account, and a list of certificates assigned to the user account; and adding a certificate taken out from the free certificate database to each of said plurality of user accounts in said user account database.

2. The method as recited in claim 1, further comprises receiving a certificate request when the number of free certificates in the certificate database is lower than a low threshold number; and generating a new certificate wherein generating the new certificate comprises,
  generating a distinguished name for the new certificate;
  generating a new private key and a new public key for the new certificate;
  sending a certificate request to the CA wherein the certificate request comprises the generated new public key;
  receiving the new certificate signed by the CA; and
depositing the new certificate in the free certificate database.

3. The method as recited in claim 1, wherein maintaining the user account database comprises:
  retrieving one of the free certificates from said free certificate database when a new thin client device is activated;
  establishing a new user account comprising a new device ID and a new subscriber ID; and
  associating the retrieved free certificate and the corresponding private key and public key with the new user account having the new device ID.

4. The method as recited in claim 1 further comprising:
  updating the free certificates in the free certificate database upon receiving a certificate updating request.

5. The method as recited in claim 4 wherein updating the free certificates in the free certificate database upon receiving the certificate updating request comprises removing an invalid certificate from the free certificate database when the certificate updating request is a certificate revocation list.

6. The method as recited in claim 1 further comprising:
  updating a user account in the user account database associated with a valid device ID upon receiving a newly provisioned username and password from a thin client device having said valid device ID.

7. The method as recited in claim 3 wherein the updating the free certificates in the certificate database upon receiving the certificate updating request comprises deleting a certificate from the certificate database according to an insert/delete query in the certificate updating request.

8. The method as recited in claim 1 wherein a user account in the user account database may be accessed from a computer coupled to said proxy server through the global internet.

9. The method as recited in claim 8 wherein a valid username and password must be supplied to access said user account.

10. An apparatus for managing centralized certificates in a proxy server device for a plurality of thin client devices over a data network, the apparatus comprising:
  a certificate manager module for generating free certificates;
  a free certificate database coupled to the certificate manager module for storing the free certificates from the certificate manager module until reaching an upper threshold;
  a user account database, said user account database not stored in a thin client device, said user account database accessible by said proxy server device that performs communication on behalf of said thin client devices, said user account database comprising a plurality of user accounts, each of the thin client devices associated with one of said user accounts wherein each of the user accounts comprises a device ID and a list of certificates assigned to the user account; and
  a certificate assigning module for associating one of said free certificates in the free certificate database to one of said plurality of user accounts in said user account database associated with a thin client device.

11. The apparatus as recited in claim 10 wherein the certificate manager module comprises:
  a certificate engine communicating with the certificate assigning module;
  a name generator generating a unique name for a new certificate;
  a key pair generator generating a private key and a public key for the new certificate; and
  a certificate request module for contacting a certificate authority for the new certificate, wherein a certificate request from said certificate request module comprises the public key and the unique name.

12. The apparatus as recited in claim 11, wherein said name generator comprises a distinguished name generator that combines a timestamp along with a subscriber ID.

13. The apparatus as recited in claim 10 wherein the certificate manager module updates said free certificate database upon receiving certificate update request.

14. The apparatus as recited in claim 13, wherein said certificate update request comprises a certificate revocation list.

15. The apparatus as recited in claim 14, wherein said certificate update request further comprises an insert/delete query.

16. The apparatus as recited in claim 10 further comprising:
  a computer network coupled to said proxy server device; and
  a client computer coupled to said computer network, said client computer able to access a user account in said user account database.

* * * * *